B. Tinkham.
Wheel Cultivator
N° 30,897.  Patented Dec. 11, 1860.
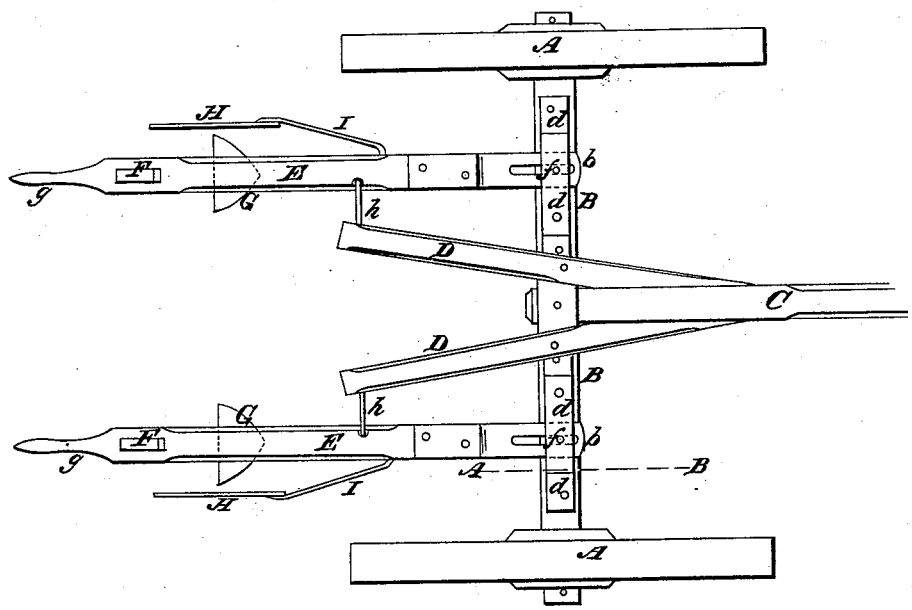
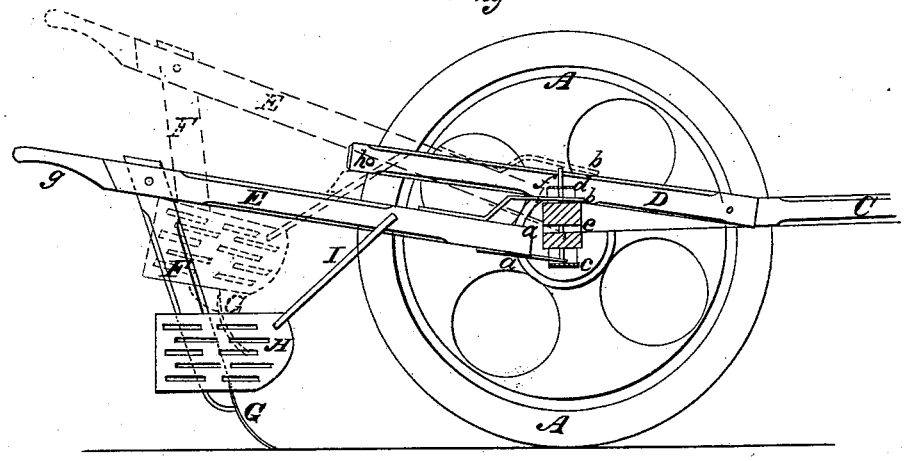
WITNESSES:
INVENTOR:
Benj'm Tinkham
By his Attorney
Thos. H. Dodge

UNITED STATES PATENT OFFICE.

BENJAMIN TINKHAM, OF CAMERON, ILLINOIS.

IMPROVEMENT IN CULTIVATORS.

Specification forming part of Letters Patent No. 30,897, dated December 11, 1860.

*To all whom it may concern:*

Be it known that I, BENJAMIN TINKHAM, of Cameron, Warren county, in the State of Illinois, have invented certain new and useful Improvements in Cultivators; and I do hereby declare that the following is a full, clear, and exact description of the same, reference being had to the accompanying drawings, forming a part of this specification, in which—

Figure 1 represents a plan view of a cultivator with my improvement applied thereto; and Fig. 2 represents a side view of the same on line A B, Fig. 1, looking in the direction of arrow 1.

The construction of my cultivator is as follows:

To the tongue or draft-beam C is rigidly secured an axle, B, which in turn is supported by wheels A A. The axle B is provided with curved top plates, $d$ $d$, and curved bottom plates, $c$, and also has mortises $e$.

To the front of the beams E E can be attached the axle B by simply passing their plates $a$ between plates $c$ and axle B and their top plates, $d$, between plates $b$ and axle B, as shown in red lines, same figure, in which latter case the plates $a$ are passed through the mortises $e$ in the axle B, and consequently the shares G will not work so deep in the earth, and, if desired, the plates $a$ can be still further raised, so as to be passed through under the curved plates $d$ and over the top of axle B, whereby the shares G would work still less in the ground.

Pins or bolts $f$ are passed down through plates $a$ $b$ and axle B, by means of which the beams E, together with the parts connected therewith, are drawn forward whenever the team advances. The draft is through the lower plates $a$, since the plates $b$ have long slots, and only serve to keep the beams E from tipping or canting over.

The construction of the mortises in the axle B, together with the openings between the plates $c$ $d$ and axle B, are of such length as to admit of the beams E being adjusted laterally to suit the width of the rows of corn or other plants to be cultivated, a series of holes for the pins or bolts $f$ being provided in both axle and plates.

To the beams E are attached stocks F, to the latter of which are connected the shares G. Side guards or shields, H, are supported at the sides of the shares G by supports I, as shown in the drawings. These shields H are provided with narrow slits or openings, as shown, so that while the shields prevent the earth from being thrown upon the young corn or other plants, the fine earth will work through the narrow slits and fall about the roots of the plants.

When the machine is to be moved from one field to another the bearings E can be raised up and supported out of the reach of obstructions, as shown in red lines, Fig. 2, where they are shown as resting upon pins $h$ in the rear of hounds D D.

When the machine is in operation the attendant takes hold of the handles $g$, by means of which he can swing either of the beams E, with its share, inward or outward, and thus make the plows conform to any inequalities in the hills or rows of corn or other plants.

It will be obvious that two or more shares could be used on a side, and also that crooked axles could be used in connection with low wheels for cultivating high corn.

The machine can be made of any proper material.

Having described my invention, what I claim as new, and desire to secure by Letters Patent, is—

1. The combination, with the axle B and plates $c$ $d$, of the beam E, plates $a$ $b$, and pins or bolts $f$, substantially as and for the purposes set forth.

2. In combination with the above, the pins or supports $h$ with the hounds D, as and for the purpose described.

In witness whereof I have hereunto subscribed my name.

BENJAMIN TINKHAM.

Witnesses:
 S. B. JOHNSON,
 F. H. WASTE.